Patented Dec. 21, 1948

2,457,087

UNITED STATES PATENT OFFICE 2,457,087

SEALING COMPOUNDS

John D. Morgan, South Orange, and Russell E. Lowe, East Orange, N. J., assignors to Cities Service Oil Company, New York, N. Y., a corporation of Pennsylvania No Drawing. Application March 30, 1945, Serial No. 585,822

14 Claims. (Cl. 260—30.6)

This invention relates to improved sealing compounds for use in forming tight joints in gas and vapor lines; between cylinder heads and their associated cylinder blocks; and in other places where mechanical joints must have their abutting faces treated with plastic material to render them leak-proof.

Conventional sealing compounds of the kinds employed in unions, pipe couplings, and the like, are of such a character that they set up into hard, cement-like coatings within a relatively short time after the matching faces of the coupling devices have been drawn tightly together. This action does not necessarily reduce the effectiveness of the compound as a sealing agent, although this has sometimes happened. It does produce a seizing of the joined surfaces which is difficult to break when repairs become necessary, and it frequently results in a galling and scoring of the coupling surfaces when they are forcibly broken apart. It is common experience, for example, upon opening a union which has been sealed for a comparatively short time, to find that its faces are so badly pitted and scored as to require the use of new coupling parts in a replacement of the joint. In those cases in which such compounds are applied to the surfaces of gaskets which in turn are interposed between the faces of the joints, the setting up of the sealing paste usually makes it necessary to destroy the gasket in the course of breaking the joint. Even where the gasket can be removed without material injury it will be found to be so stiff and hard as a result of the setting up of the compound as to render it unfit for reuse. This means, of course, that new gaskets must be employed each time a joint of this kind is reformed, with attendant trouble and expense.

The admixing of a petrolatum or soap greases with sealing compounds has the effect of lengthening the time within which they remain in plastic condition and tends to offset to some extent the objections heretofore outlined. The improvement is, however, of a rather transitory nature for even these softened compounds will set up in the course of events. It is also apparent that the use of these softened agents very greatly limits the utility of the resulting compounds. It is quite obvious, for example, that a compound containing petroleum jelly has little or no utility in sealing a gasoline line, for it will soon be washed away by the solvent action of the gasoline and allow leaks to develop. Similarly, soap softened compounds are not of much value in sealing compounds which are subject to the solvent action of water and many other fluids. A further criticism of these softening agents is their vulnerability to chemical change, particularly at elevated temperatures, and to the fact that their consistencies vary over an extremely wide range with changing temperatures, wherefore the sealing compound may be too soft to be retained in the joint under some conditions or too hard to be applied to it under others.

All of the foregoing problems of establishing and maintaining leak tight joints with existing compounds become peculiarly acute in aircraft work where lines for the transmission of gasoline, hydraulic fluids, and high pressure oxygen—to mention but a few—must be maintained absolutely leak tight for reasons of safety as well as economy. It will be recognized that these fluid lines are a favorite target for enemy gunfire in combat, as well as being subject to continuous and excessive vibration in the most peaceful of operations. The joints must therefore be opened to allow for replacement or inspection perhaps more frequently in this than in any other kind of service. A further complication of course arises from the fact that aircraft fluid lines are subject to rapid and extreme changes of temperature which tend to open up their joints unless the sealing compound employed retains a plastic character so that it will always accommodate itself to changing conditions.

The principal object of the invention is to provide a soft, jelly-like composition of matter which retains a substantially uniform plasticity for extended periods of time, far beyond anything heretofore known in the way of sealing compounds, and which is neither affected by excessive heat nor by the solvents of normal gases and liquids, wherefore it is particularly well suited as a base for compounds which are employed in the sealing of mechanical joints.

It is a further object of the invention to provide a base of a stable, inert jelly-like paste together with small proportions of talc and graphite or other fillers, which is soft enough to be readily spread over the surfaces of a mechanical joint, which adheres well to such surfaces, and is neither subject to oxidation, polymerization or other chemical change even after long continued heating in the presence of oxygen and other gases at extremely high temperatures and pressures.

Another object of the invention is to provide a sealing paste of the foregoing character in which the components, and particularly the base material, are not soluble in water, gasoline, naphtha, or any of the ordinarily used commercial solvents, which is neither flammable nor capable of sustaining combustion, and which appears to have no corrosive effect upon copper, steel, aluminum, and the other ordinary materials of construction.

We have discovered that a substantially fully polymerized thermo-setting plastic such as the reaction product of phenol formaldehyde condensation can be dispersed in a synthetic oily liquid to form a soft, jelly-like composition, the consistency of which may be varied in the formation of the gel to suit individual requirements, and which, once established, will be retained for indefinitely long periods of time even when the gel is subjected to extremely high temperatures and pressures. In forming the gel we have found that tri-o-cresyl phosphate, tri-octyl phosphate and di-butyl phthalate are well adapted to act as the liquid phase in which the phenolic resin is dispersed, and that the resulting products are chemically inert, being subject to neither oxidation, polymerization, or other chemical change which would vary their essential properties. In addition, we find that these products are insoluble in any of the commercial aliphatic or aromatic solvents. We have further discovered that talc and graphite may be worked into the foregoing gels to form pastes of varying consistencies, which retain a high degree of plasticity for incredibly long periods of time and which, because of their inert character, are ideally suited for use as joint sealing compounds. In compounding these sealing pastes we prefer to employ from 55 to 70 per cent by weight of the gel; from 40 to 29 per cent of talc—which serves primarily as a filler—and small quantities of graphite varying between say 5 and 1 per cent of the weight of the total composition to form products of varying consistency, which have proven highly effective in the sealing of joints in high pressure oxygen lines, in gasoline and oil piping systems and in a wide variety of other mechanical joints which are subject to high temperature, high pressure, or both—as well as to the action of liquids and gases of a highly solvent nature.

One example of a compound in accordance with the invention has the following formula in which the percentages are given by weight with respect to the total composition:

| | Percent |
|---|---|
| Gel of phenol formaldehyde condensation and tri-o-cresyl phosphate | 65 |
| Talc | 33 |
| Powdered graphite | 2 |

In preparing the gel for the example composition we mixed about 17 per cent by weight of an 80 per cent solution of phenol formaldehyde resin in equal parts of ethyl alcohol and acetone, with about 83 per cent by weight of tri-o-cresyl phosphate, and heated this mixture to an ultimate temperature of between 440 and 460° F. with constant stirring. This solution, which was clear at the start, began to show signs of hazing and clouding at a temperature of about 415° F., which became increasingly evident until the liquid reached a state of complete opacity at a temperature of about 445° F. The exact temperature at which clouding would first be noted cannot be stated with precision because it has been found to vary even in the preparation of gels from the same reaction products, and to some extent upon the amount of solvent employed for the resin. We have found, however, that when the temperature is raised from 20° to 30° above the point of first hazing, a reaction occurs in which the entire mass goes over suddenly from liquid state to a thick and heavy gel. It may also be noted that during the heating operation, and particularly after the driving off of the alcohol and acetone solvents for the resin, there was a heavy evolution of formaldehyde vapor which stopped just about as suddenly as the jelling reaction started. At that point, namely when the jelling reaction was started, we immediately discontinued both the heating and stirring and allowed the gel to cool to room temperature.

The character of the phenol formaldehyde resin which is employed appears to be highly critical to the formation of a suitable gel. We have found, for example, that the starting product must not have been carried much beyond first stage polymerization and that it should contain an excess of formaldehyde.

The gel of the foregoing resin solution and tri-o-cresyl phosphate was a stiff, jelly-like product having a clear, ruddy brown color, and which gave evidence of being a colloidal dispersion of fully polymerized resin rather than a true compound of the resin and phosphate. Thus, when the gel was subjected to long continued heating at a temperature of from 500 to 600° F., the tri-o-cresyl phosphate was evaporated away, leaving a mass of fully polymerized phenolic condensation product. Whether this is so or not, we shall refer to the gel as a colloidal dispersion of fully polymerized resin for easy description. This product as such, was too stiff and rubber-like in character to spread easily—in a requirement of a sealing compound—and we accordingly worked it in a colloid mill until it was reduced to a uniformly plastic product having the general consistency of a cup grease. To this we added small quantities of talc and graphite referred to above and kneaded them in until a homogeneous paste was obtained, which was then ready for use as a sealing product.

In testing the sealing properties of the paste, we joined together a number of short lengths of ⅛ inch brass pipe with standard brass fittings, the threaded portions of each joint being thoroughly coated with the example paste before final assembly to form a line which was closed at one end. That line was then connected to an oxygen tank and subjected to a pressure of 2150 lbs. per sq. in., after which it was heated to a temperature of about 575° F. and held there for a period of about 50 minutes. When the line had cooled sufficiently, we submerged it in water while still containing oxygen at the high pressure just mentioned, for the purpose of detecting any leaks which might have developed in the sealed joints. A careful inspection of the submerged line failed to disclose the formation of any bubbles around the joints and gave every evidence that the connections had been maintained fully sealed throughout the test. The oxygen supply was then shut off and each of the joints was broken for inspection. It might be noted that the joints came apart very readily, there being no evidence of seizing, and inspection showed that their faces and threaded portions were free from galling and roughening and that the coatings of sealing composition were just about as soft and plastic as at the time of application. Further tests have demonstrated that the composition retains its plastic character even after being confined between opposing faces of pipe couplings for many months, and we have been unable to discover any tendency on the part of the material to set up as a result of the application of high temperatures and pressures.

In a separation test such as that to which soap greases are frequently subjected we held the example composition at a temperature of 450° F. for a period of 24 hours. At the end of that time there was no evidence of separation of the talc and graphite from the gel, or of the resin from the tri-o-cresyl phosphate—that is to say, there had been no reaction comparable to the bleeding of the grease. It was evident, however, that some very slight amount of tri-o-cresyl phosphate had been evaporated away. The sealing compound was, however, still soft and pliable, even with the loss of some of its phosphate content and was still entirely suitable for use as a sealing compound. The sealing compound was additionally tested for solubility and for chemical activity. It proved to be completely insoluble in water at 212° F., in boiling benzenes, toluene, and other aromatic solvents, as well as in aliphatic diluents such as methyl and ethyl alcohol, ethyl ether, chloroform and the like, and was wholly unaffected by tri-butyl phosphate, and other commercial solvents. Insofar as chemical activity is concerned, we have been unable to find any evidence of oxidation product when subjected to the pressure of oxygen at 2150 lbs. per sq. in. and at 575° F., and have demonstrated that the sealing compound will not support combustion. Standard corrosion tests show that it has no effect upon copper, brass, aluminum or steel, or the various alloys of these materials.

The consistency of the gel which is employed as a base may be varied within wide limits in the course of its preparation by the variation of suitable percentages of resin solution and tri-o-cresyl phosphate. We have, for example, prepared gels ranging in consistency from that of a thick, heavy oil at one end of the scale to a product having about the consistency of a hard cup grease by the use of from 5 to 20 per cent of phenolic resin solution, and from 95 to 80 per cent of tri-o-cresyl phosphate. It should be noted, however, that the final consistency of the product is determined in the course of its preparation and that once the gel has been formed, it cannot be made softer by the addition of tri-o-cresyl phosphate, or harder by adding phenolic resin solution, for neither of these products is soluble in, or compatible with, a completed gel.

We have found that we can also prepare gels of the phenolic resin solution described above with tri octyl phosphate, and with di butyl phthalate, the procedures for preparing them being substantially the same as that described above for the formation of tri-o-cresyl phosphate gel, and that these gels can also be blended with talc and graphite fillers to form excellent sealing compounds. The ratios of fillers to the tri octyl and di butyl phthalates may be substantially the same as those given for the tri-o-cresyl gel; and the consistency of these gels may be varied in their formation by the use of from 5 to 20 per cent of the resin solution with 95 to 80 per cent of the liquid phase material.

The new gel compositions are claimed in a separate application Serial No. 585,823, filed March 30, 1945, now abandoned, and our present application is confined to claims to sealing compositions of the gels with suitable fillers.

Having described our invention, what we claim as new is:

1. A compound for sealing mechanical joints comprising a major proportion of a gel of a substantially fully polymerized, thermosetting, phenol-formaldehyde resin dispersed in tri-o-cresyl phosphate, said gel having about the consistency of a soft cup grease, and minor proportions of talc and graphite, uniformly distributed through said gel to form a paste.

2. A compound for sealing mechanical joints and the like comprising from about 55 to about 70 per cent by weight of a gel of a substantially fully polymerized, thermosetting, phenol-formaldehyde resin dispersed in tri-o-cresyl phosphate, from about 40 to about 29 per cent by weight of talc and from about 5 to about 1 per cent by weight of graphite, said talc and graphite being uniformly distributed through said gel.

3. A compound for sealing mechanical joints comprising about 65 per cent by weight of a gel of a substantially infusible phenol-formaldehyde resin dispersed in tri-o-cresyl phosphate and having about the consistency of a soft cup grease, about 33 per cent by weight of talc, and about 2 per cent by weight of graphite.

4. A compound for sealing mechanical joints and the like comprising from about 55 to about 70 per cent by weight of a gel of a substantially fully polymerized, thermosetting, phenol-formaldehyde resin dispersed in tri octyl phosphate, from about 40 to about 29 per cent by weight of talc and from about 5 to about 1 per cent by weight of graphite.

5. A compound for sealing mechanical joints and the like comprising from about 55 to about 70 per cent by weight of a gel of a substantially fully polymerized, thermosetting, phenol-formaldehyde resin dispersed in di butyl phthalate, from about 40 to about 29 per cent by weight of talc and from about 5 to about 1 per cent by weight of graphite.

6. A compound for sealing mechanical joints comprising a gel of from about 4 to 16⅔ per cent of a substantially fully polymerized, thermosetting, reaction product of phenol-formaldehyde condensation dispersed in from about 96 to 83⅓ per cent of an oily liquid of low vapor pressure chosen from the group consisting of tri-o-cresyl phosphate, tri-octyl phosphate, and di-butyl phthalate; and a filler uniformly mixed with said gel.

7. A compound for sealing mechanical joints and the like comprising from about 4 to 16⅔ per cent of a gel of substantially fully polymerized, thermo-setting, phenol-formaldehyde condensation product, and from about 96 to 83⅓ per cent of tri-o-cresyl phosphate, as a base sealing material; and a filler uniformly mixed with said gel 8. A compound for sealing mechanical joints and the like comprising a gel of from 12 to 16⅔ per cent by weight of a substantially fully polymerized, thermo-setting, phenol-formaldehyde condensation product dispersed in from 88 to 83⅓ per cent by weight of tri-o-cresyl phosphate, said gel constituting the base sealing ingredient; and a filler.

9. A compound for sealing mechanical joints and the like comprising a gel of about 14 per cent by weight of a substantially fully polymerized, thermosetting, phenol-formaldehyde condensation product dispersed in about 86 per cent by weight of tri-o-cresyl phosphate, said gel constituting the base sealing material; and a filler uniformly mixed with said gel.

10. A compound for sealing mechanical joints comprising a gel of from 4 to 16⅔ per cent of a substantially fully polymerized, thermosetting, phenol-formaldehyde condensation product dispersed in from 96 to 83⅓ per cent of tri-o-cresyl phosphate, as a base material, and minor proportions of talc and graphite, uniformly mixed with said gel as fillers.

11. A compound for sealing mechanical joints and the like comprising from 55 to 70 per cent by weight of a gel of about 14 per cent by weight of a substantially fully polymerized, thermosetting, phenol-formaldehyde resin dispersed in about 86 per cent by weight of tri-o-cresyl phosphate, from 40-29 per cent by weight of talc, and from 5 to 1 per cent of graphite.

12. A compound for sealing mechanical joints and the like comprising about 65 per cent by weight of a gel of about 14 per cent by weight of a substantially fully polymerized, thermosetting, phenol-formaldehyde resin dispersed in about 86 per cent by weight of tri-o-cresyl phosphate, about 33 per cent by weight of talc, and about 2 per cent of graphite.

13. A compound for sealing mechanical joints and the like comprising a gel of from 8 to 16 per cent by weight of a substantially fully polymerized, thermosetting, phenol-formaldehyde condensation product dispersed in from 92 to 84 per cent by weight of tri octyl phosphate, said gel serving as a base sealing material, and a filler uniformly mixed with said gel.

14. A compound for sealing mechanical joints and the like in which the base sealing ingredient is a gel of from 8 to 16 per cent by weight of a substantially fully polymerized, thermosetting, phenol-formaldehyde condensation product dispersed in from 92 to 84 per cent by weight of di butyl phthalate, and a filler uniformly mixed with said gel.

JOHN D. MORGAN.
RUSSELL E. LOWE.

REFERENCES CITED

The following references are of record in the file of this patent:

UNITED STATES PATENTS

| Number | Name | Date |
| --- | --- | --- |
| 1,065,495 | Aylsworth | June 24, 1913 |
| 1,439,056 | Baekeland | Dec. 19, 1922 |
| 1,695,566 | Turkington | Dec. 18, 1928 |